(12) United States Patent
Price

(10) Patent No.: US 7,937,881 B2
(45) Date of Patent: May 10, 2011

(54) BIRD DECOY

(76) Inventor: Craig Allen Price, Allenton, MI (US)

(*) Notice: Subject to any disclaimer, the term of this patent is extended or adjusted under 35 U.S.C. 154(b) by 186 days.

(21) Appl. No.: 12/056,552

(22) Filed: Mar. 27, 2008

(65) Prior Publication Data

US 2009/0241401 A1 Oct. 1, 2009

(51) Int. Cl.
*A01M 1/06* (2006.01)
(52) U.S. Cl. .................................. 43/3; 446/35
(58) Field of Classification Search .......... 43/3; 446/35, 446/37; 244/11, 22, 72
See application file for complete search history.

(56) References Cited

U.S. PATENT DOCUMENTS

| | | | | |
|---|---|---|---|---|
| 1,525,565 A | * | 2/1925 | Bean | 244/22 |
| 2,576,209 A | * | 11/1951 | Berger | 40/417 |
| 3,869,823 A | * | 3/1975 | Powers et al. | 43/3 |
| 4,128,958 A | | 12/1978 | Snow | |
| 4,620,385 A | * | 11/1986 | Carranza et al. | 43/3 |
| 4,896,448 A | | 1/1990 | Jackson | |
| 5,191,730 A | | 3/1993 | Balmer | |
| 5,231,780 A | | 8/1993 | Gazalski | |
| 6,170,188 B1 | | 1/2001 | Mathews | |
| 6,293,042 B1 | | 9/2001 | Arvanitis, Jr. et al. | |
| 6,493,980 B1 | | 12/2002 | Richardson et al. | |
| 6,508,028 B1 | | 1/2003 | Crowe | |
| 6,572,428 B1 | | 6/2003 | Weiser et al. | |
| 6,574,903 B2 | | 6/2003 | Solomon | |
| 6,675,522 B2 | | 1/2004 | Mathews | |
| 6,698,132 B1 | | 3/2004 | Brint | |
| 6,715,228 B1 | | 4/2004 | Price | |
| 7,651,051 B2 | * | 1/2010 | Agrawal et al. | 244/22 |
| 2008/0028664 A1 | * | 2/2008 | Anthony | 43/3 |

* cited by examiner

*Primary Examiner* — Kimberly S Smith
*Assistant Examiner* — Danielle Clerkley
(74) *Attorney, Agent, or Firm* — VanOphem & VanOphem, PC

(57) ABSTRACT

A decoy, typically used for hunting fowl, having a hollow body including a head, a tail and a pair of feet. The decoy includes a pair of wings mounted to the body of the decoy for multi-axis movement. A drive mechanism typically including an electric motor and a power source is positioned within the hollow body. A pair of crank members connect to the electric motor and extend outwardly from the body. A pair of link members connect the wings to the crank members whereby rotation of the crank members enables cyclic movement defined by up/down and fore/aft motion of the wings.

6 Claims, 8 Drawing Sheets

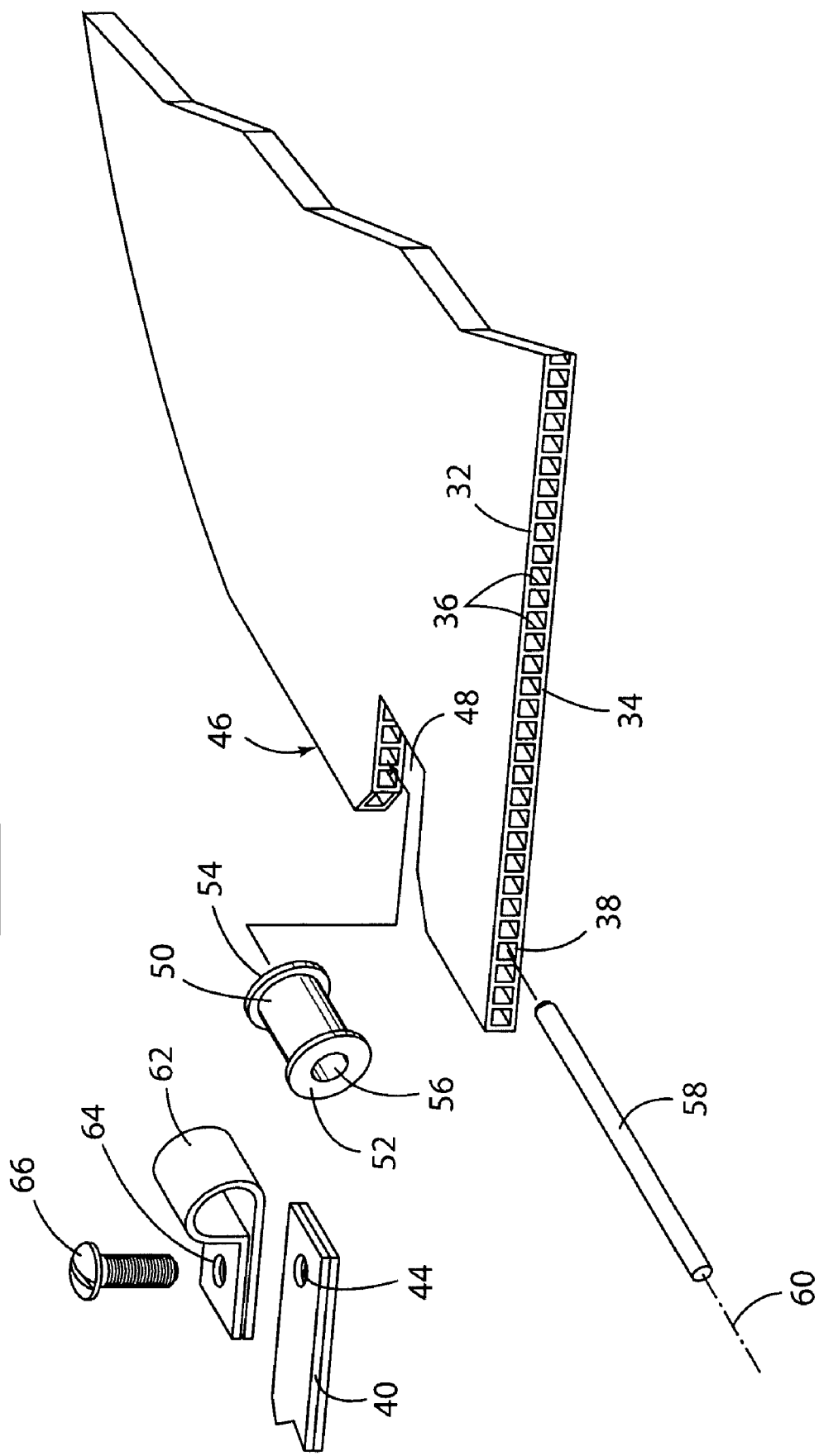

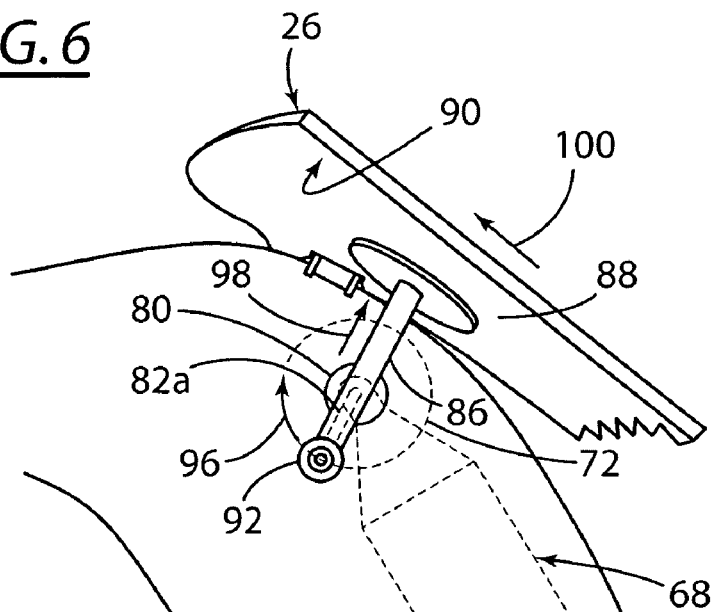
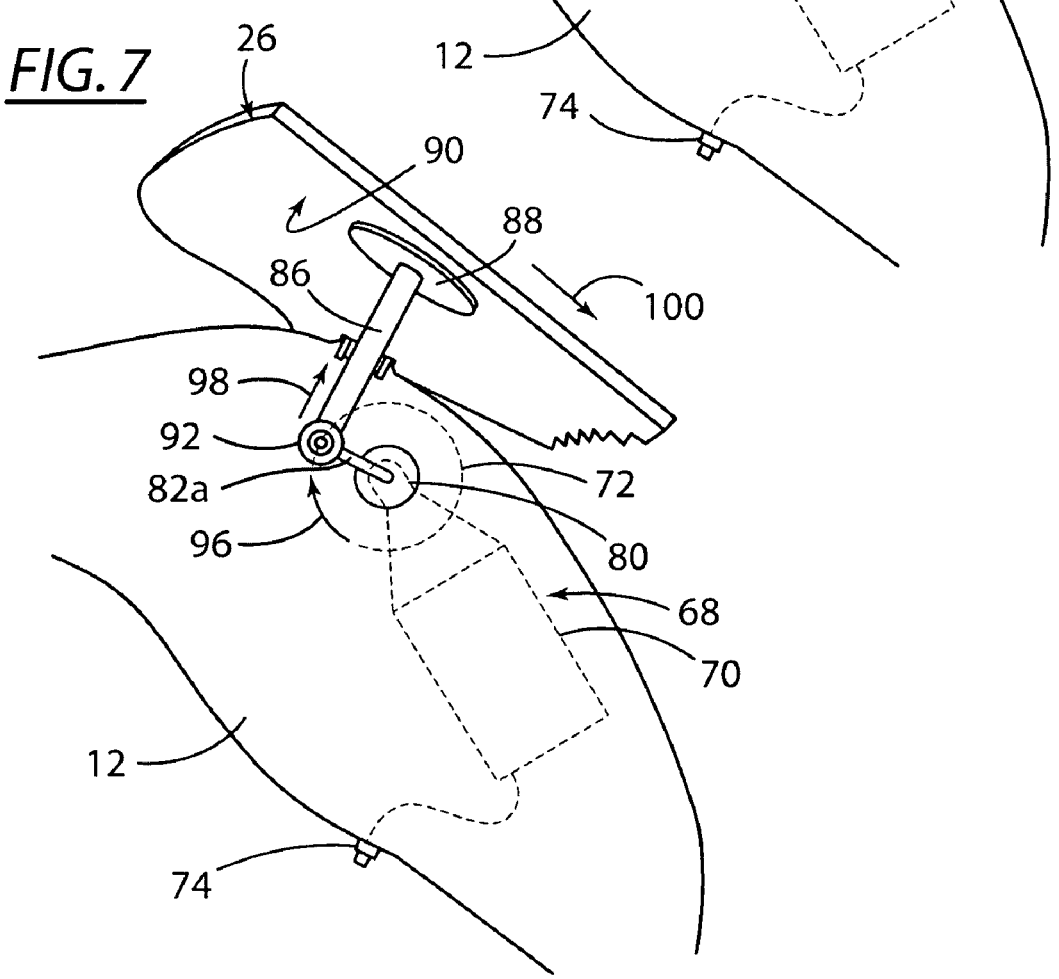

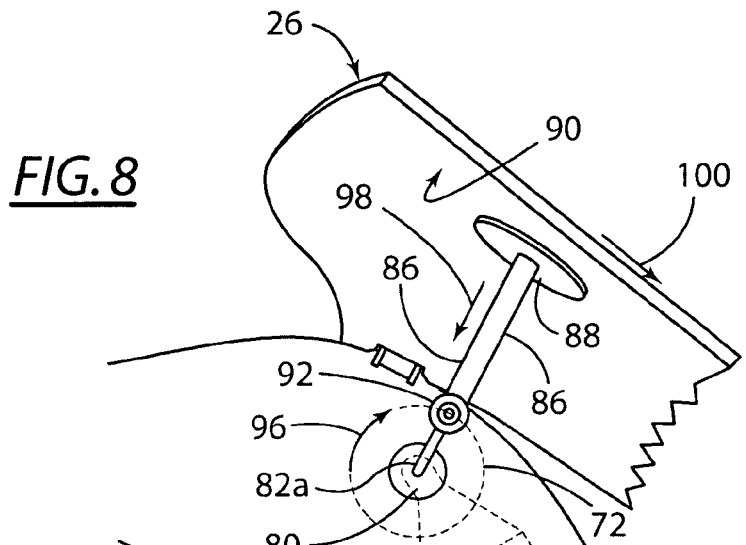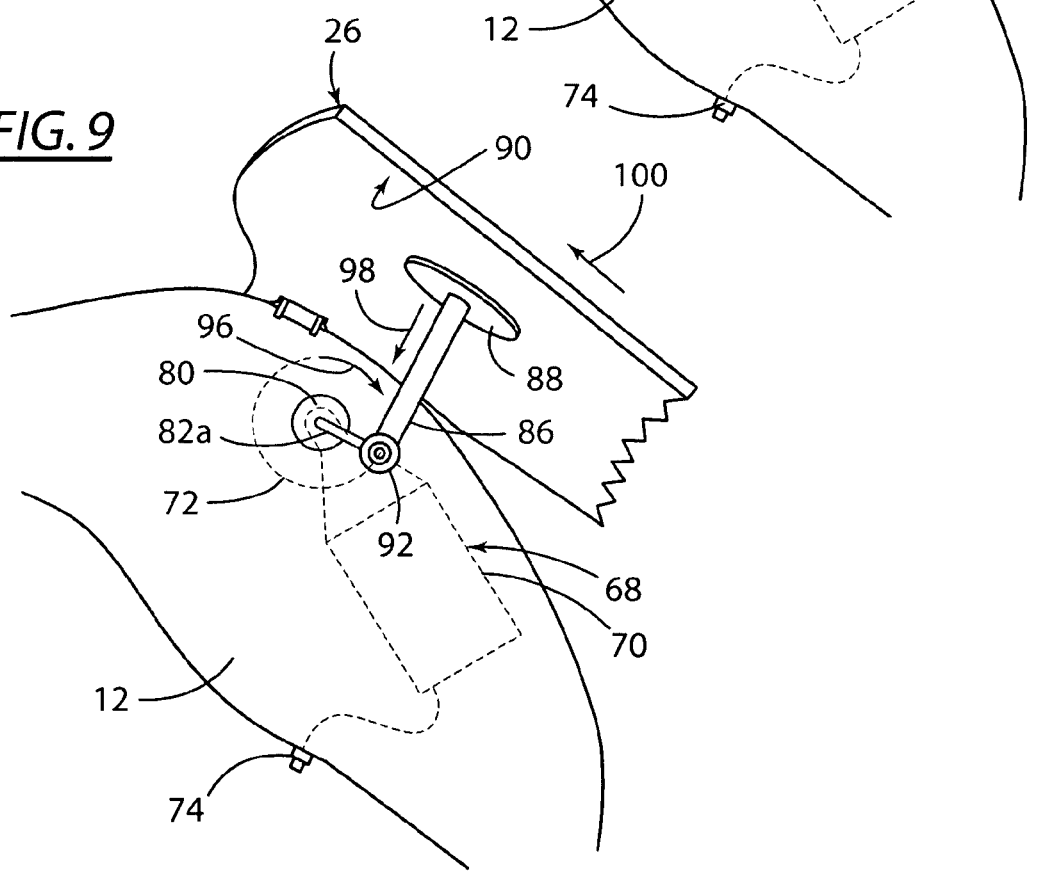

BIRD DECOY

CROSS-REFERENCE TO RELATED APPLICATIONS

Not Applicable.

FEDERALLY SPONSORED RESEARCH OR DEVELOPMENT

Not Applicable.

REFERENCE TO SEQUENCE LISTING

Not Applicable.

BACKGROUND OF THE INVENTION

1. Field of the Invention

The present invention relates to bird decoys. More specifically, this invention is directed to a decoy having a movable wing.

2. Description of Related Art

Decoys have long been used by hunters for attracting game birds, in many instances migratory waterfowl such as ducks and geese. Typically, a decoy is made of a one-piece construction that either floats on a body of water or can be placed on land. Typically, a plurality of decoys is placed in an area proximate to a blind with the hope that the natural appearance of the decoys will attract live birds to join the group.

Decoys having movable wings or other movable appendages such as heads that turn or feet that move are also known. It is believed that decoys having movable appendages that emulate motions made by a live bird are more likely to attract live birds as they appear more natural. Therefore, a decoy should attempt to depict the movements of a live bird in a more realistic manner so as to attract rather than scare away live birds.

U.S. Pat. No. 4,128,958 to Snow discloses one type of decoy made to resemble a duck or a goose having movable wings controlled by strings or other flexible members. Pulling on the strings causes the wings to move in an up and down manner.

U.S. Pat. No. 4,896,448 to Jackson discloses another type of bird decoy having the wings attached to a flapping mechanism extending through slots formed in the body. The flapping mechanism includes a rotary drive wheel rotated by a motor. The rotary drive wheel is connected to a drive link that reciprocates along a slot wherein the drive link is connected to the wings.

U.S. Pat. No. 5,231,780 to Gazalski discloses a plastic shell game bird decoy having rod-like wing supports and a pivotal neck both of which can be actuated by an operation cord used to manually move the wings and rotate the neck.

U.S. Pat. No. 6,170,188 to Mathews discloses another type of bird decoy having wing members rotatably connected to the body of the decoy and using an electric motor to rotate the wing members in a circular manner.

U.S. Pat. No. 6,493,980 to Richardson et al. discloses a decoy having a drive motor for operating a pair of outwardly projecting revolving wings, wherein the wings rotate about their longitudinal axis.

One of the problems with bird decoys, as set forth above, is that the rotary or simple up-and-down motion do not necessarily create and maintain both a realistic appearance and realistic movement of a bird wing that accurately simulates that of a live bird. Enhancing the ability of a decoy by incorporating a wing movement in a lifelike manner helps to attract birds to the hunter. Accordingly, it can be appreciated that there is a need to provide a bird decoy having a wing that moves in a realistic manner and simulates the flight of a bird.

SUMMARY OF THE INVENTION

According to the preferred embodiment of the present invention, there is provided a bird decoy having simulated wing movement. The wing is attached to the body of the decoy and is driven in a manner simulating the wings of a landing bird. The wing is secured to the body of the decoy in a manner enabling multi-axis movement of the wing. A drive system connected to the wing is operative to drive the wing in a multi-axis motion.

In one form of the invention, the mounting assembly includes a pivot pin having a longitudinal axis. The pivot pin is attached to the wing and coupled to the body, wherein the wing rotates about a longitudinal axis of the pivot pin and pivots about an axis skewed or oblique with respect to the longitudinal axis of the pivot pin. In one embodiment thereof, the pivot pin is disposed within an aperture of a bushing and a loop fastener, secured to the body of the decoy, surrounds the bushing to couple the pivot pin to the body.

The drive system includes a motor, a crank member connected to the motor and a link connected to both the wing and the crank member. Thus, as the motor rotates the crank member, the crank member drives the link to impart motion to the wing attached to the link.

Accordingly, it is an object of the present invention to provide a decoy that simulates a landing bird wherein the wings move in a multi-axis manner. In one embodiment, the wings move both up and down and back and forth. Depending upon the drive system and the mounting assembly, the wings can move through a complex degree of motion.

These objects and other features, aspects and advantages of this invention will be more apparent after a reading of the following detailed description, appended claims and accompanying drawings.

BRIEF DESCRIPTION OF THE DRAWINGS

FIG. 4 is an exploded view of one embodiment of a mounting assembly used to attach a wing to the body of the decoy according to the present invention illustrated in FIG. 1;

FIGS. 6-9 are partial side views of the decoy according to the present invention illustrated in FIG. 1 showing various positions and movement of the wing;

DETAILED DESCRIPTION OF THE PREFERRED EMBODIMENTS

Figure 1:
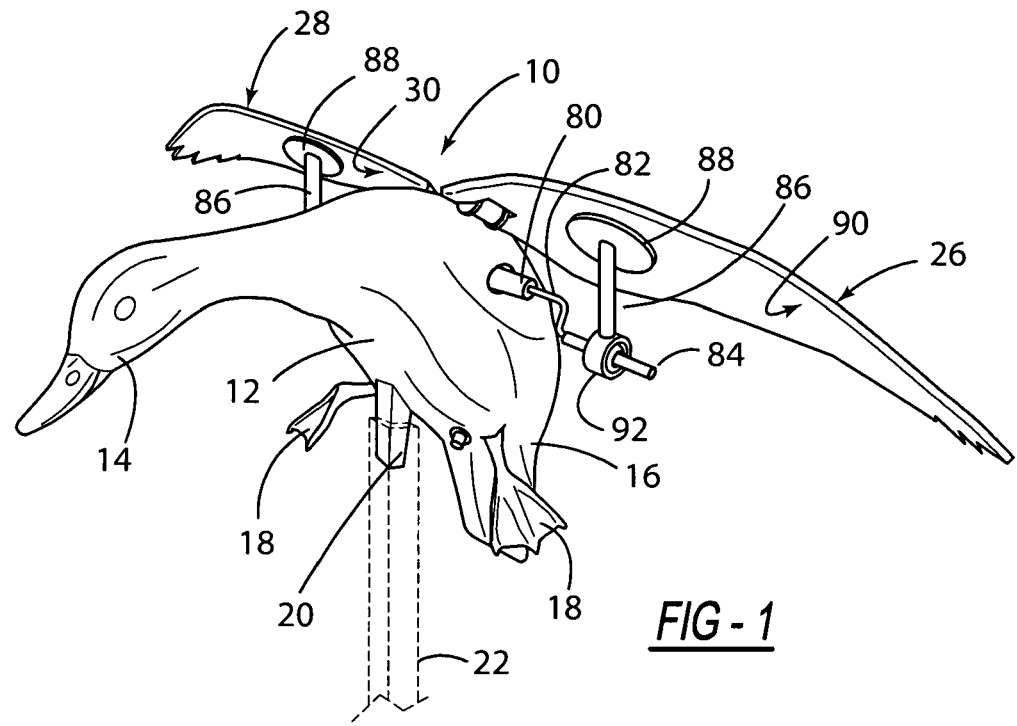
FIG. 1 is a front perspective view of a decoy according to the present invention.
Figure 2:
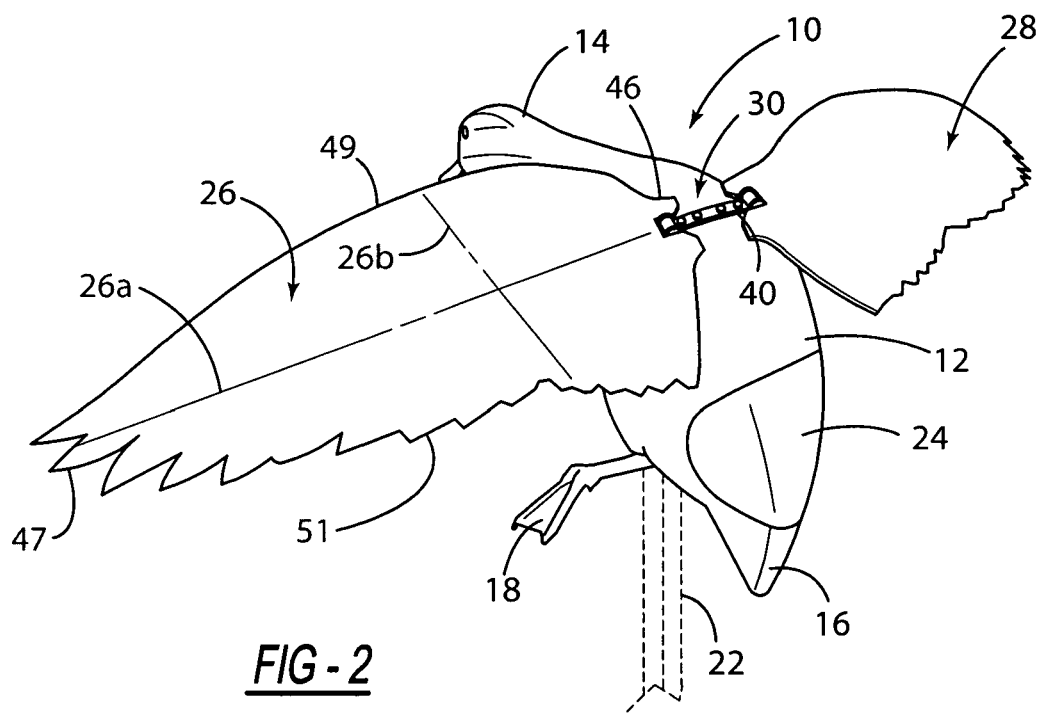
FIG. 2 is a rear perspective view of the decoy according to the present invention illustrated in FIG. 1.

Turning now to FIGS. 1-2, there is shown a bird decoy seen generally at 10 according to a first embodiment of the present invention. The bird decoy 10 includes a body 12 having a head 14, a tail 16 and a pair of feet 18, with the body 12 extending along a longitudinal axis from the head 14 to the tail 16. A post 20 extends outwardly from the body 12 and engages a support stand or pole 22 used to support the body 12, typically above a body of water. The body 12 is typically formed of plastic or fiberglass with a hollow shell interior. A cover or hatch 24 allows access to the interior of the body 12. In the present embodiment, the body 12 of the bird decoy 10 is configured in a lifelike manner to illustrate or simulate a game bird, such as a duck, about to land on a water surface.

A pair of movable wings 26, 28 extend or project outwardly from the body 12. A mounting assembly, seen generally at 30, secures the pair of movable wings 26, 28 to the body 12 whereby they may move or flap in a manner simulating a bird, such as a duck, during landing. The mounting assembly 30 is such that it allows the pair of movable wings 26, 28 to have multi-axis movement; i.e., the pair of movable wings 26, 28 move in more than one direction. An example of such movement is illustrated in FIGS. 6-9 wherein the pair of movable wings 26, 28 move both up and down and forward and rearward with respect to the body 12. The pair of movable wings 26, 28 are substantially identically shaped mirror images defining a left and a right, and are colored or patterned based upon the particular type of bird being hunted. As illustrated in FIG. 2, the wing 26 has a longitudinal axis 26a extending from the inner end 46 of the wing 26 to tip 47 of the wing 26. The wing 26 also has a lateral axis 26b extending from the front or leading edge 49 of the wing 26 to the rear or trailing edge 51 of the wing 26. The pair of movable wings 26, 28 are typically made of a resilient material such as a plastic as the wing body is subjected to torque during operation of the bird decoy 10. FIG. 4 illustrates a preferred embodiment wherein the pair of movable wings 26, 28 are made of a corrugated plastic material formed of upper 32 and lower 34 thin wall plastic sheets interconnected by a plurality of rib members 36. The upper 32 and lower 34 thin wall plastic sheets and adjacent opposing rib members 36 form a plurality of channels or passageways 38 extending through the pair of movable wings 26, 28. Forming the wings 26, 28 of such a corrugated plastic material results in a lightweight, strong and resilient pair of movable wings 26, 28 that can be shaped to simulate the wing of a bird.

Figure 3:
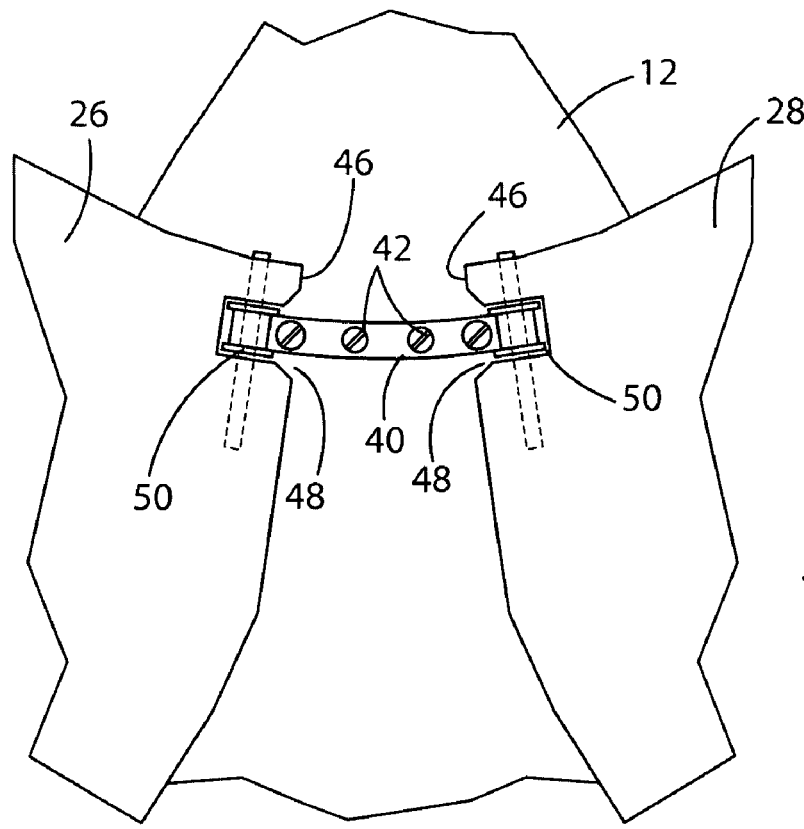
FIG. 3 is a top view of the decoy according to the present invention illustrated in FIG. 1.
Figure 5:
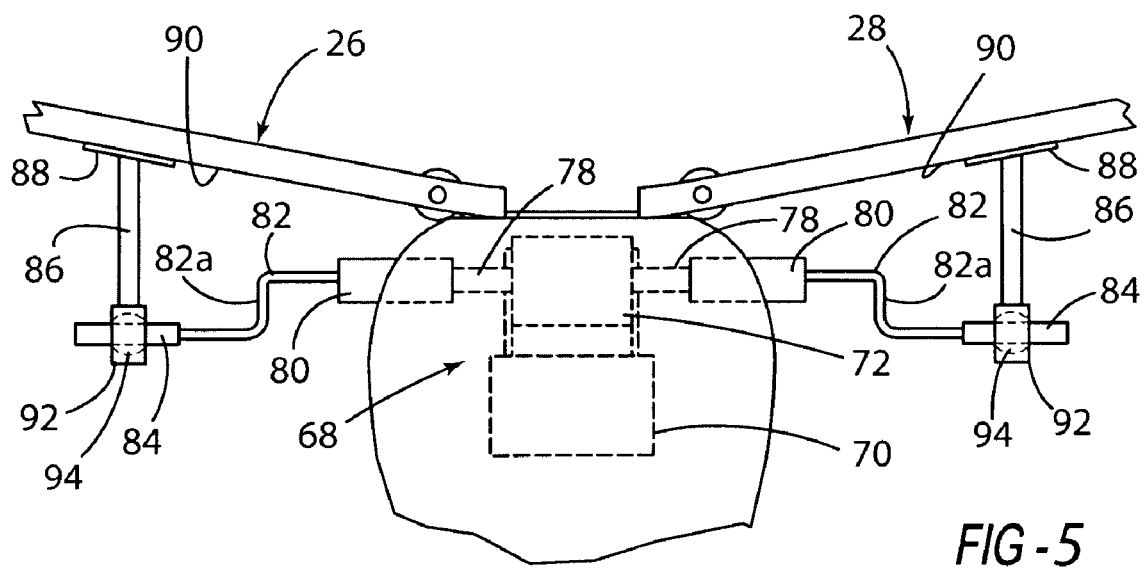
FIG. 5 is a rear view of the decoy according to the present invention illustrated in FIG. 1.
Figure 10:
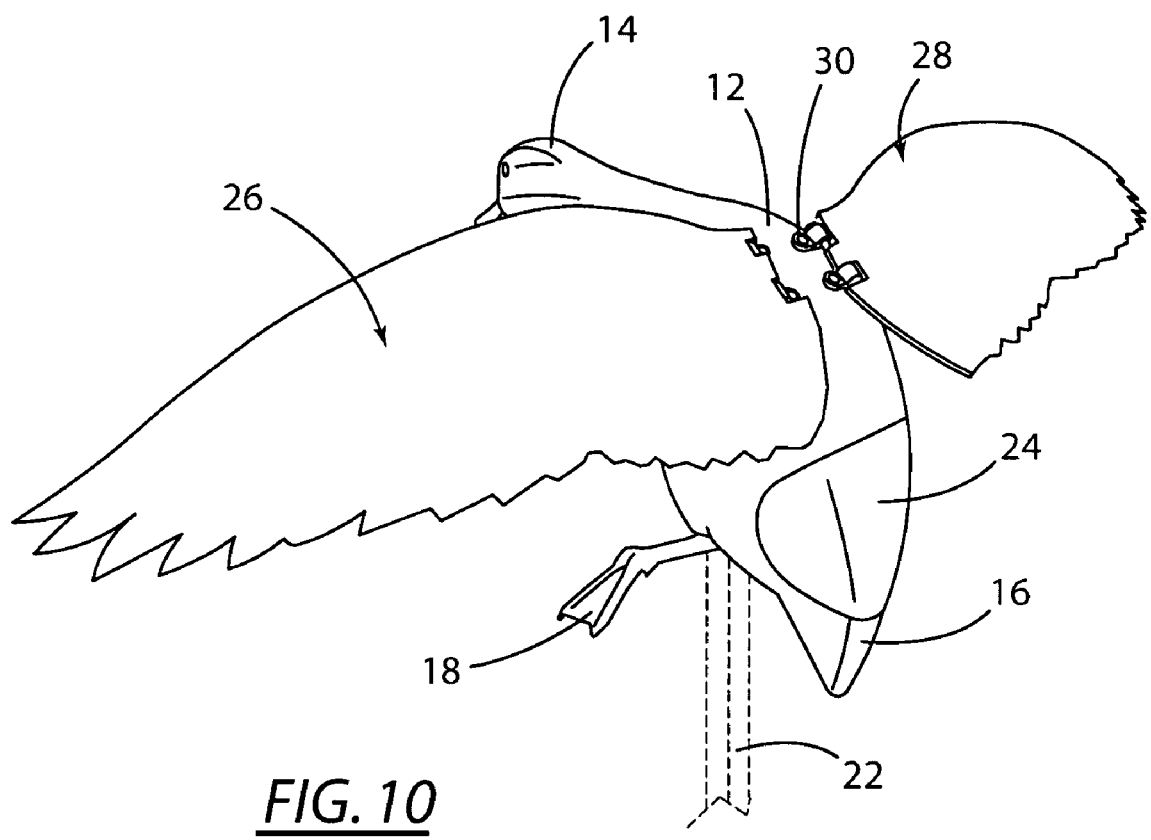
FIG. 10 is a rear perspective view of an alternate embodiment of the decoy according to the present invention.
Figure 11:
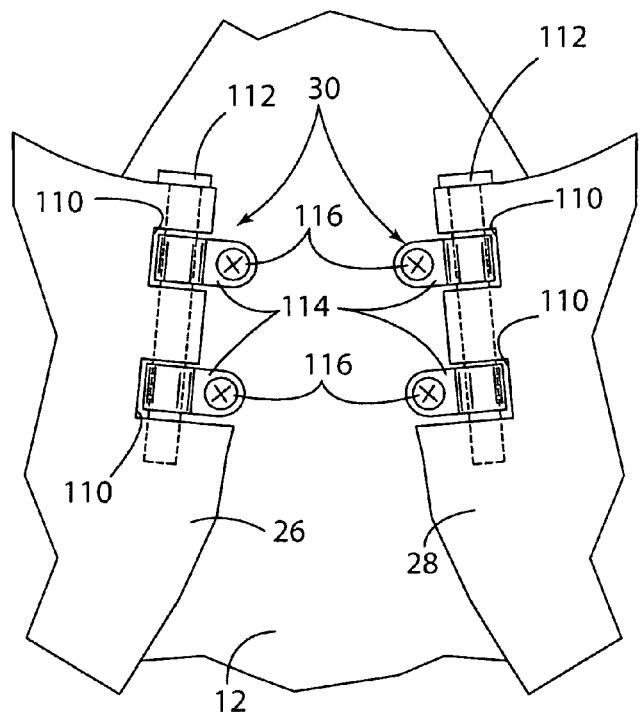
FIG. 11 is a top view of the alternate embodiment of the decoy as illustrated in FIG. 10.

FIGS. 3-5 illustrate one embodiment of a mounting assembly 30 used to attach the pair of movable wings 26, 28 to the body 12 of the bird decoy 10. The mounting assembly 30 includes a tie strap 40 attached to the body 12 by a pair of threaded fasteners or screws 42. The tie strap 40 has apertures 44 located at each end. The inner end 46 of the wing 26 has a notch 48 sized to receive a bushing 50 having flange portions 52, 54 at each end thereof. The bushing 50 has an aperture or throughbore 56 extending between the flange portions 52, 54. A pivot pin 58 extends through one of the plurality of channels or passageways 38 on one side of the notch 48 through the aperture 56 of the bushing 50 and into a corresponding channel or passageway 38 on the opposite side of the notch 48 to couple the bushing 50 to the wing 26. The pivot pin 58 is of a diameter such that it fractionally fits within the passageway 38. The diameter of the aperture 56 in the bushing 50 is slightly greater than the diameter of the pivot pin 58 whereby the bushing 50 rotates about the longitudinal axis 60 of the pivot pin 58 and also oscillates or pivots on the pivot pin 58 in a plane containing the longitudinal axis 60 of the pivot pin 58.

A fastener member, one example of which being a loop fastener or clip 62, has a mounting portion that surrounds the bushing 50 between the flange portions 52, 54. An attachment portion of the fastener member is used to secure the fastener member to the body 12 of the bird decoy 10. The loop fastener 62 has an attachment portion that contains an aperture 64 through which a fastener 66 extends to secure the loop fastener 62 and correspondingly, the wing 26 to the body 12 of the bird decoy 10. As illustrated, the fastener 66 extends through the aperture 64 and into the aperture 44 located in the tie strap 40. Accordingly, the present invention provides for a loose fit or gap between the components of the mounting assembly 30 that enables multi-axis movement of the wing 26 whereby the wing 26 moves in both an up and down manner and also rocks back and forth, that is, it extends forward and rearward with respect to the body 12 of the bird decoy 10.

As illustrated in FIGS. 5-9, the bird decoy 10 contains a drive system, seen generally at 68, used to drive the pair of movable wings 26, 28 in a flapping manner to simulate a flying or landing bird. The drive system 68 generally includes a power source or battery 70, typically a battery disposed within the hollow shell of the body 12. An electric motor 72 receives power from the battery 70. Upon actuation of a switch 74 connected to the battery 70, power from the battery 70 energizes the electric motor 72 thereby driving the axles 78. A connector 80 connects a crank member 82 on one end thereof to each of the drive axles 78. Any convenient fastener (not shown) may be used to secure the connector 80 to the crank member 82. A flexible, yet resilient sleeve 84 is attached to the opposite end of each of the crank members 82.

A drive link 86 having a plate member 88 connected on one end thereof attaches to the under surface 90 of each of the pair of movable wings 26, 28, as shown in FIG. 5, such that the plate member 88 engages the under surface 90 of each of the pair of movable wings 26, 28, for example at the midpoint between the ends of the pair of movable wings 26, 28. An annular member 92 attached to the opposite end of the drive link 86 houses a spherical bearing 94. The flexible sleeve 84 is journaled in the spherical bearing 94. As with the mounting assembly 30, the flexible sleeve 84 fits loosely in the spherical bearing 94, shown in FIGS. 6-9, to allow the spherical bearing 94 to move or slide as necessary with respect to the annular member 92 which houses the spherical bearing 94. In addition, the flexible sleeve 84 has a certain degree of resiliency whereby it flexes as the pair of wings 26, 28 move.

Turning now to FIGS. 6-9 for purposes of illustration there is shown only one wing 26 recognizing that both wings 26, 28 together experience the motion generated by the movement of the drive axles 78 and connectors 80. The wing 26, is shown in various stages of motion as the left drive axle 78 and connector 80 (as viewed from front to rear end of the bird decoy) rotates in the direction shown by the arrow 96. Starting with FIG. 6, the left drive axle 78 and connector 80 are located such that the crank throw 82a of the crank member 82 is in the lowest vertical position. As the left drive axle 78 and connector 80 rotates in a clockwise direction, as illustrated by the arrow 96, and the wing 26 moves from the position illustrated in FIG. 6 to that shown in FIG. 7. The crank member 82 acting upon the drive link 86 lifts the wing 26 upward in the direction illustrated by the arrow 98, which also causes the wing 26 to move in the forward direction illustrated by the arrow 100 in FIG. 6. Upon reaching the position illustrated by FIG. 7, the wing 26 is placed in the fully forward position and is at the midpoint of its up and down stroke. Continued rotation of the left drive axle 78 and connector 80 in the direction of the arrow 96 causes the wing 26 to move from the position illustrated in FIG. 7 to that shown in FIG. 8. During the transition from the position illustrated in FIG. 7 to that shown in FIG. 8, the wing 26 continues its upward motion, however, the wing 26 now moves in the rearward direction illustrated by the arrow 100. Thus, in FIG. 8, the wing 26 is placed in its fully up position and is located at the midpoint of its forward and back position. As the left drive axle 78 and connector 80 continues to rotate, and the wing 26 moves from the position illustrated in FIG. 8 to that shown in FIG. 9, the wing 26 continues its rearward motion as illustrated by the arrow 100 in FIG. 8. However, the wing 26 now moves downward in the direction illustrated by the arrow 98. Thus in FIG. 9, the wing 26 is at its fully rearward position and the midpoint of its up and down stroke. Finally, continued rotation of the left drive axle 78 and connector 80 in the direction of the arrow 96 moves the wing 26 from the position shown in FIG. 9 to that shown in FIG. 6 and completes one rotation of the left drive axle 78 and connector 80. As the wing 26 moves from the position illustrated in FIG. 9 to that shown in FIG. 6, the wing 26 continues its downward motion as illustrated by the arrow 98 in FIG. 9, however, the wing 26 moves in the forward direction as illustrated by the arrow 100 in FIG. 6. Upon reaching the position illustrated in FIG. 6, the wing 26 returns to its lowest and midpoint position. Accordingly, it should be understood that for each rotation of the left drive axle 78 and connector 80, the crank member 82 causes the wing 26 to move in both an up and down manner and a forward and rearward manner as illustrated by the arrows 98, 100 in FIGS. 6-9.

Figure 12:
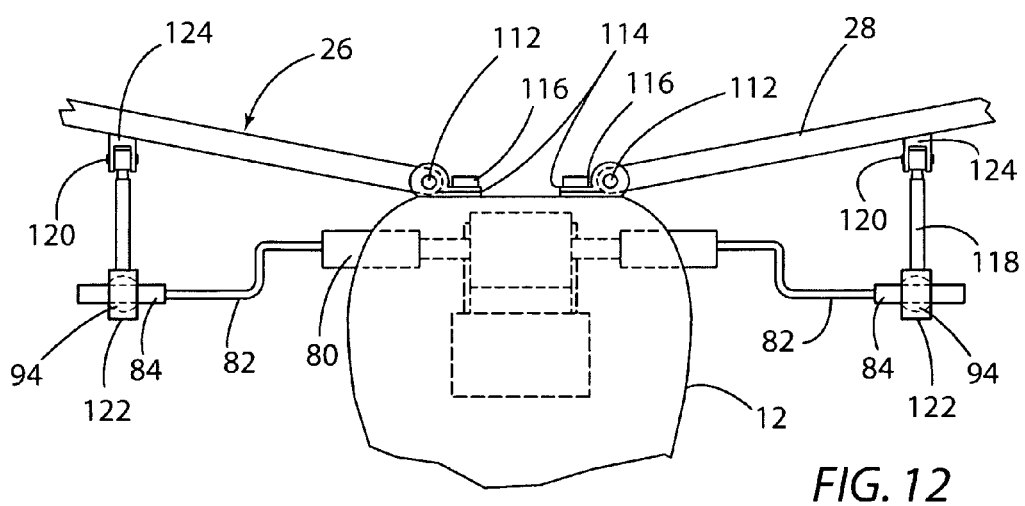
FIG. 12 is a rear view of the alternate embodiment of the decoy as illustrated in FIG. 10.
Figure 13:
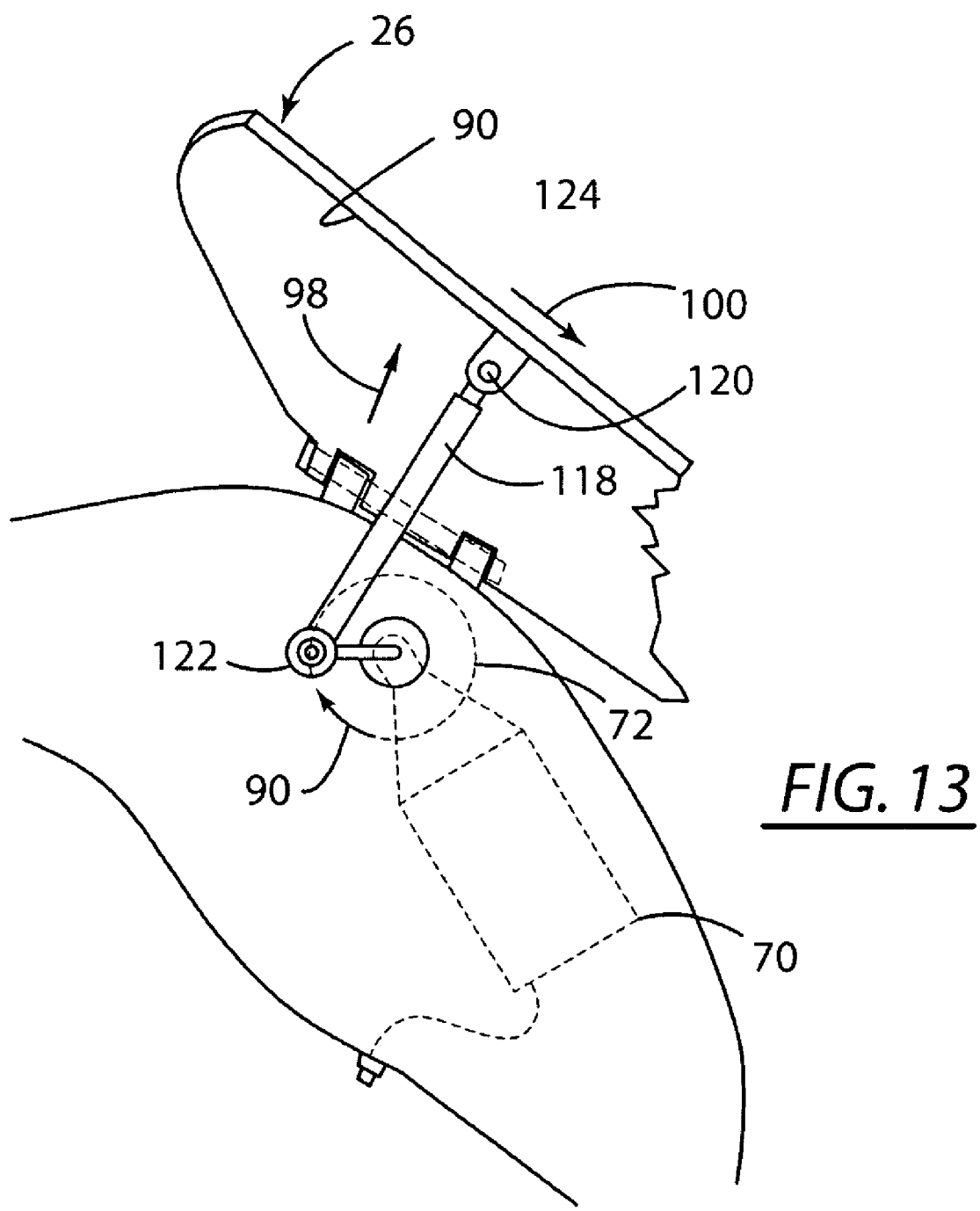
FIG. 13 is a side view of the alternate embodiment of the decoy as illustrated in FIG. 10.

FIGS. 10-13 show an additional embodiment of the present invention, with like parts having like reference numbers, wherein the mounting assembly 30 includes a plurality of notches 110 located in each wing 26, 28 with a pivot pin 112 extending across or spanning the notches 110 and connected to the pair of movable wings 26, 28. A pair of loop fasteners 114 is used in combination with fasteners 116 to attach the pair of movable wings 26, 28 to the body 12 of the bird decoy 10. Once again, the pair of loop fasteners 114 are sized whereby the pivot pin 112 fits loosely thereby allowing a certain amount of play and enabling the pair of movable wings 26, 28 to pivot or move about the mounting assembly 30. As illustrated in FIG. 12, the link member 118 is pivotably connected to a pin 120 attached to the under surface 90 of each wing 26, 28 by a bracket 124. The opposite end of the link member 118 having an annular member 122 that houses a spherical bearing 94 that fits over the flexible sleeve 84 coupled to the crank member 82. As with the previous embodiment, the annular member 122 fits loosely over the spherical bearing 94 which is held by the sleeve 84 to allow movement thereof along the flexible sleeve 84 as the crank member 82 rotates about the longitudinal axis of the drive axles 78.

Accordingly, the present invention provides a mounting assembly 30 and drive system 68 combining to drive each wing 26, 28 in a manner that simulates the landing of a bird. That is, the pair of movable wings 26, 28 have a multi-axis movement, both back and forth and up and down.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A decoy comprising:
   a body member comprising a head, a tail, a body portion therebetween, and feet;
   a pair of wings attached to said body portion in opposing relationship;
   means for mounting said pair of wings to said body portion, said mounting means connected to said body portion and securing each wing of said pair of wings to said body portion, said mounting means comprising at least one pivot pin having a longitudinal axis coupled to each of said wings; and
   at least one loop fastener connected to said body portion wherein said at least one loop fastener and said at least one pivot pin cooperate to secure each wing of said pair of wings to said body portion in a manner enabling each wing of said pair of wings to move in a plurality of axes;
   a drive system comprising a motor disposed within said body portion of said decoy; and a pair of crank members connected to opposing sides of said motor, each crank member of said pair of crank members having one end and an opposite end; and
   a pair of link members, each link of said pair of link members having one end connected to a complimentary wing of said pair of wings and an opposite end connected to a complimentary end of each said crank member of said pair of crank members such that operation of said motor rotates said pair of crank members to enable cyclic movement defined by up, fore, down, aft motion of each wing of said pair of wings.

2. A decoy as claimed in claim 1 including a pair of resilient members each of said resilient members disposed between a complimentary one of each end of said pair of crank members and a complimentary one of said pair of link members.

3. A decoy as claimed in claim 1 wherein each said link member of said pair of link members is rigidly attached to each said complimentary wing of said pair of wings at one end thereof and further comprising a bearing member interposed said opposite end of each said link member and each respective end of said crank member, said crank member driving said each link member through each said bearing member.

4. A decoy as claimed in claim 1 wherein said drive system further comprises a pair of drive axles and a pair of connectors, each disposed between the respective drive axles and respective crank members.

5. A decoy as claimed in claim 1 wherein said means for mounting further comprises at least one bushing member having an aperture therethrough, said aperture having a longitudinal axis, said at least one pivot pin disposed in said at least one bushing member and operative to rotate about said longitudinal axis of said at least one pivot pin and move oblique to said longitudinal axis of said at least one pivot pin when said pivot pin is disposed in said at least one bushing member.

6. A decoy comprising:
   a hollow body member, said hollow body member further comprising a head at one end a tail at an opposite end and a hollow body portion therebetween;
   a pair of wings, each of said wings having a wing tip and an inner end, a longitudinal axis extending between said wing tip to said inner end, each of said wings having a leading edge and a trailing edge and a lateral axis extending between said leading edge and said trailing edge, said inner ends of each of said wings having a notch portion;
   a pair of pivot pins, each of said pivot pins, having a longitudinal axis, each of said pivot pins cooperating with a respective wing wherein said pivot pin is coupled to said respective wing and extends across said notch portion such that said longitudinal axis of said pair of pivot pins are substantially parallel to said lateral axis of each said respective wing;
   a pair of loop fasteners, each of said loop fasteners cooperating with a respective pivot pin to connect said respective wing to said body portion;
   a motor secured within said hollow body potion;

a pair of crank members, each said crank member having one end extending from said hollow body portion and an opposite end connected to opposing sides of said motor whereby operation of said motor rotates said crank members; and a pair of link members having one end connected to a respective crank member and an opposite end connected to a respective wing of said pair of wings such that rotation of said crank members moves enables cyclic movement, defined by up, fore, down, aft motion of said wings.

* * * * *